United States Patent
Noll et al.

(10) Patent No.: US 8,914,165 B2
(45) Date of Patent: Dec. 16, 2014

(54) INTEGRATED FLIGHT CONTROL AND COCKPIT DISPLAY SYSTEM

(75) Inventors: Christopher Noll, Glastonbury, CT (US); Steven A. Avritch, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 532 days.

(21) Appl. No.: 13/074,067

(22) Filed: Mar. 29, 2011

(65) Prior Publication Data
US 2012/0253564 A1 Oct. 4, 2012

(51) Int. Cl.
*G06F 19/00* (2011.01)
*G06G 7/76* (2006.01)
*G06F 3/14* (2006.01)
*G01C 23/00* (2006.01)

(52) U.S. Cl.
CPC .............. *G06F 3/1423* (2013.01); *G01C 23/00* (2013.01); *G09G 2380/12* (2013.01)
USPC ........................................................ 701/14

(58) Field of Classification Search
None
See application file for complete search history.

(56) References Cited

U.S. PATENT DOCUMENTS

| | | |
|---|---|---|
| 2,412,350 A | 12/1946 | Morgan |
| 4,845,495 A | 7/1989 | Bollard et al. |
| 5,883,586 A | 3/1999 | Tran et al. |
| 6,043,854 A | 3/2000 | Scott |
| 6,154,637 A | 11/2000 | Wright et al. |
| 6,189,836 B1 | 2/2001 | Gold et al. |
| 6,281,810 B1 | 8/2001 | Factor |
| 6,480,763 B1 | 11/2002 | Lappos |
| 6,633,810 B1 | 10/2003 | Qureshi |
| 6,803,860 B1 | 10/2004 | Langner et al. |
| 7,091,881 B2 | 8/2006 | Judge et al. |
| 7,307,549 B2 * | 12/2007 | Firra .......................... 340/974 |
| 7,420,476 B2 | 9/2008 | Stiffler |
| 7,437,221 B2 | 10/2008 | Hardman et al. |
| 7,742,846 B2 | 6/2010 | Fanciullo et al. |
| 2010/0168939 A1 | 7/2010 | Doeppner |
| 2012/0297108 A1 * | 11/2012 | Mitani et al. ................ 710/316 |

OTHER PUBLICATIONS

EP Search Report for application No. 12159670.4 completed on Apr. 16, 2014.

* cited by examiner

*Primary Examiner* — Paul Danneman
(74) *Attorney, Agent, or Firm* — Carlson, Gaskey & Olds, P.C.

(57) ABSTRACT

A Human Machine Interface includes a flight control system operable to communicate display data directly to a cockpit display system.

10 Claims, 3 Drawing Sheets

INTEGRATED FLIGHT CONTROL AND COCKPIT DISPLAY SYSTEM

BACKGROUND

The present disclosure relates to a Human Machine Interface, and more particularly to a flight control computer.

Cockpit display systems provide the visible and audible portion of the Human Machine Interface by which aircrew interface with an aircraft. In a typical avionics system, a dedicated suite of Flight Control Computers (FCCs) cross communicate through their own Cross Channel Data Link (CCDL) and an independent set of Cockpit Display Computers (CDCs) cross-communicate with their own CCDL. External sensors and other avionics communicate data along separate paths to the FCC suite and the CDC suite.

SUMMARY

A Human Machine Interface according to an exemplary aspect of the present disclosure includes a flight control system operable to communicate display data directly to a cockpit display system.

A method of presenting display data on a cockpit display system according to an exemplary aspect of the present disclosure includes communicating display data from a flight control system directly to a cockpit display system.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
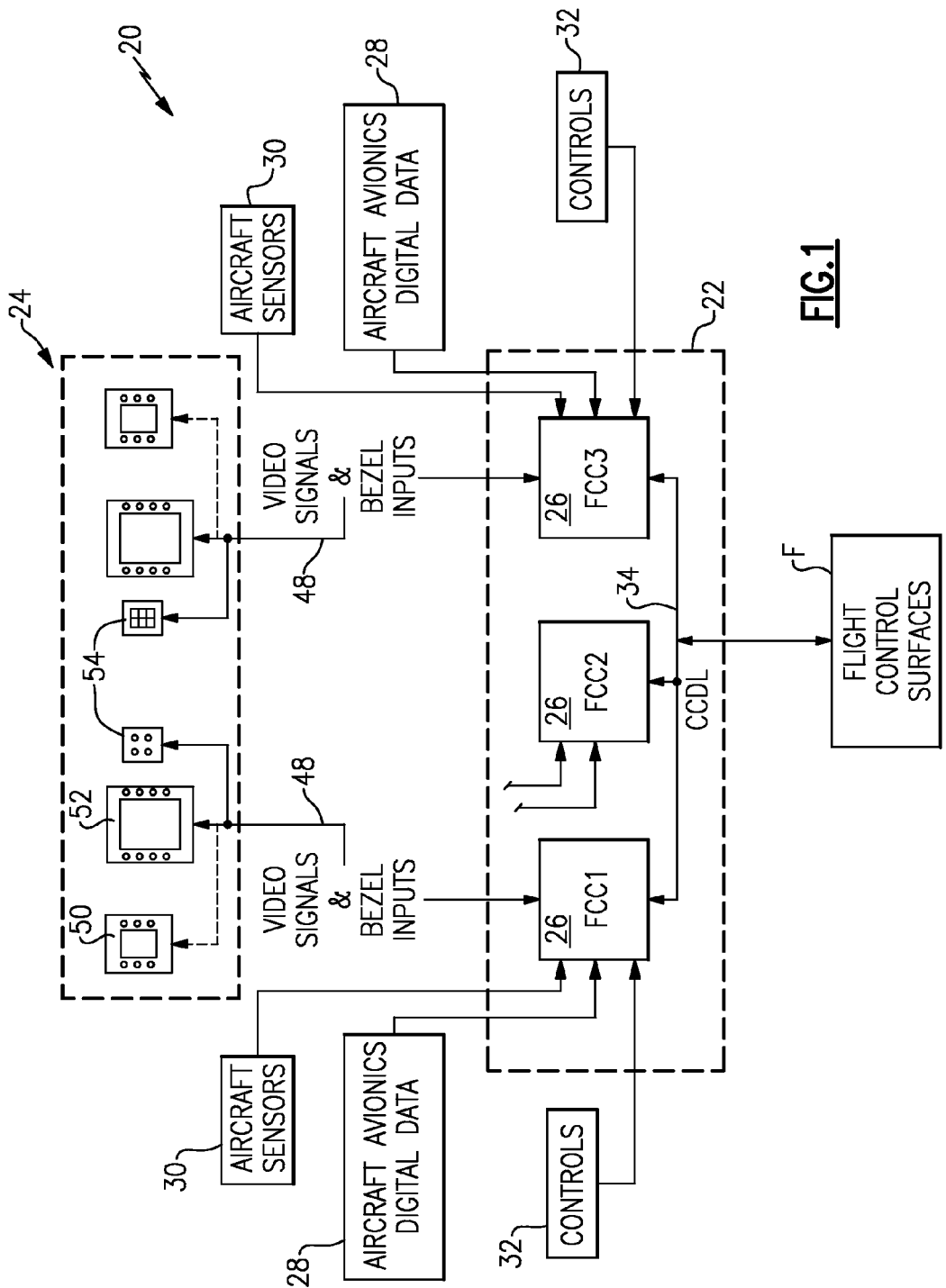
FIG. 1 is a schematic diagram of an exemplary a Human Machine Interface.

FIG. 1 schematically illustrates a Human Machine Interface 20 such as that for use within an aircraft. As will be appreciated, an aircraft is just an example environment in which the disclosed system architecture can be deployed and is a not intended to limit the application. The architecture can be deployed with similar benefits within a fixed wing aircraft, rotary wing aircraft, helicopters, as well as other land, sea, air and space vehicles. The architecture can be further deployed within simulators of such vehicles.

The Human Machine Interface 20 generally includes a flight control system 22 and a cockpit display system 24. The flight control system 22 generally includes a multiple of redundant Flight Control Computers (FCCs) 26 which are in communication with other systems such as avionic systems 28, sensor systems 30 and cockpit controls 32. The flight control system 22 may be implemented as a digital fly-by-wire system with, for example, a triple modular redundant architecture in which each FCC 26 may be identical in hardware and software and interconnected by a Cross Channel Data Link (CCDL) 34. The FCCs 26 sample inputs, communicate with the other FCCs 26 via the CCDL 34, vote by majority, calculate flight control laws then output control values to produce changes in hydraulic, electrical or mechanical flight control actuation systems that alter the flight control surfaces F (illustrated schematically). The flight control system 22 may also communicate with other aircraft systems such as an avionics bus, a weapons bus, an electronic warfare bus, and additional devices and/or networks.

Each FCC 26 is disclosed in terms of functional block diagrams, and it should be understood by those skilled in the art with the benefit of this disclosure that the functions thereof may be enacted in either dedicated hardware circuitry or programmed software routines capable of execution in a microprocessor based electronics control embodiment. According to one disclosed non-limiting embodiment, each of the FCCs 26 may be a single Line Replaceable Unit (LRU) which may be replaced with another LRU of the same construction directly on the flight line.

Figure 2:
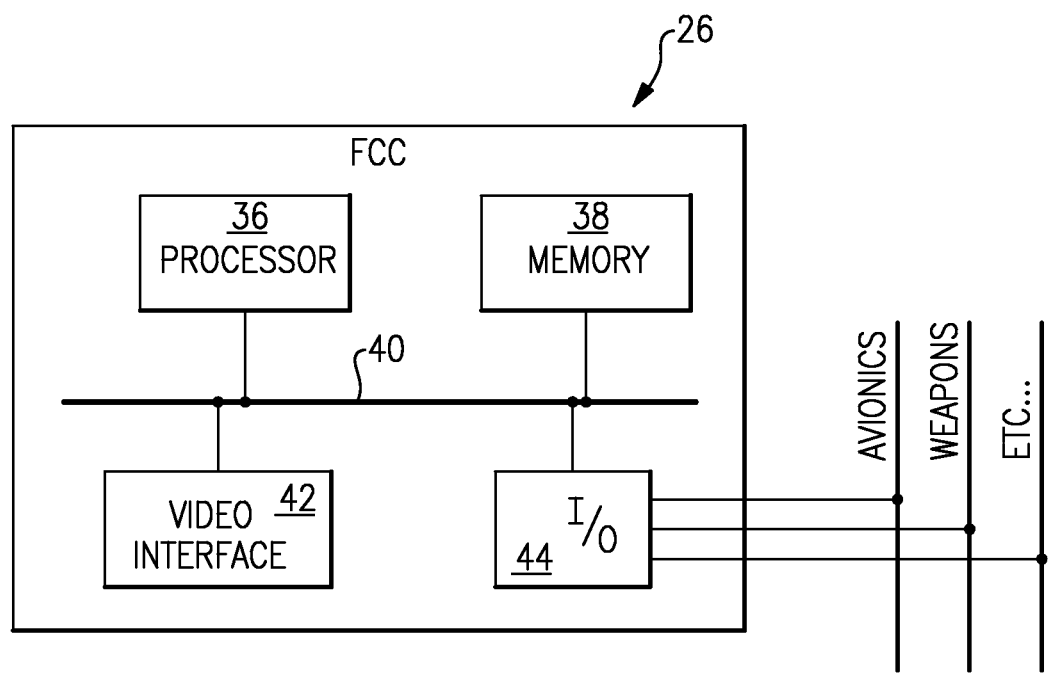
FIG. 2 is a block diagram of an FCC.

With reference to FIG. 2, each FCC 26 generally includes a processor 36, a memory 38, a local interface 40, a video interface 42, and a general input/output (I/O) interface 44. Also present can be support circuitry, power supplies and other subsystems. It should be understood that various other module architectures may alternatively or additionally be provided.

The processor 36 may be any type of known microprocessor having desired performance characteristics to execute logical instructions. The memory 38 may include several devices to include volatile and non-volatile memory components to store data, software, logic routine instructions, computer programs, files, operating system instructions, and the like. Software used to carry out the functions described herein can be broken-up so that different parts can be selectively executed by the processor 36 or, if present, among multiple processors 36 over the local interface 40. The local interface 40 may be implemented via one or more of a data bus, control bus, and/or a network. The I/O interface 44 may be used to establish a temporary connection with a device such as a flash memory device to exchange data or files with the processor 36, such as preflight mission planning data.

Each FCC 26 can utilize the onboard video interface 42 to drive the cockpit display system 24 directly through communication of display data 48. In some arrangements, not every FCC 26 need include the video interface 42. The video interface 42 may be implemented as either a standalone function on a separate processor or processing card within the FCC 26 or may be an additional software partition running on the same processor 36 as the FCC functions.

The cockpit display system 24 in the disclosed non-limiting embodiment often includes one or more Multi Function Displays (MFDs) 50, one or more Primary Flight Displays (PFDs) 52 as well as other cockpit displays 54 (FIG. 1). The display data 48 may include symbology as well as other data, referred herein as bezel input data. Bezel input data may include, but not be limited to, data which operates and communicates through the cockpit display system 24. Bezel input data may be used to control and operate soft keys, keypads, and/or other interfaces through which aircrew interface with the cockpit display system 24. It should be understood that the bezel input data may be alternatively or additionally processed by another processor such as that within the MFD and PFD to process the bezel/soft switch actuation then relayed to the FCC 26 but is still contemplated and encompassed by the architecture disclosed herein.

The video interface 42 directly communicates the display data 48 to the cockpit display system 24 as there is typically a significant amount of common data that is consumed by both the flight control system 22 and the cockpit display system 24. That is, the display data 48 is not from separate computers such as Cockpit Display Computers (FIG. 3; Prior Art) but direct from the FCCs 26.

Through utilization of the FCC 26 to directly communicate display data 48 to the cockpit display system 24, simplification of data paths is readily facilitated. This is particularly true with flight control systems in which the FCC 26 has evolved further toward a Vehicle Management System, implementing higher level functionality that makes the FCC an aircraft data focal point. The Human Machine Interface 20 of FIG. 1 provides display of flight data, sensor data, and avionics data using FCCs 26 absent the CDCs of FIG. 3.

Figure 3:
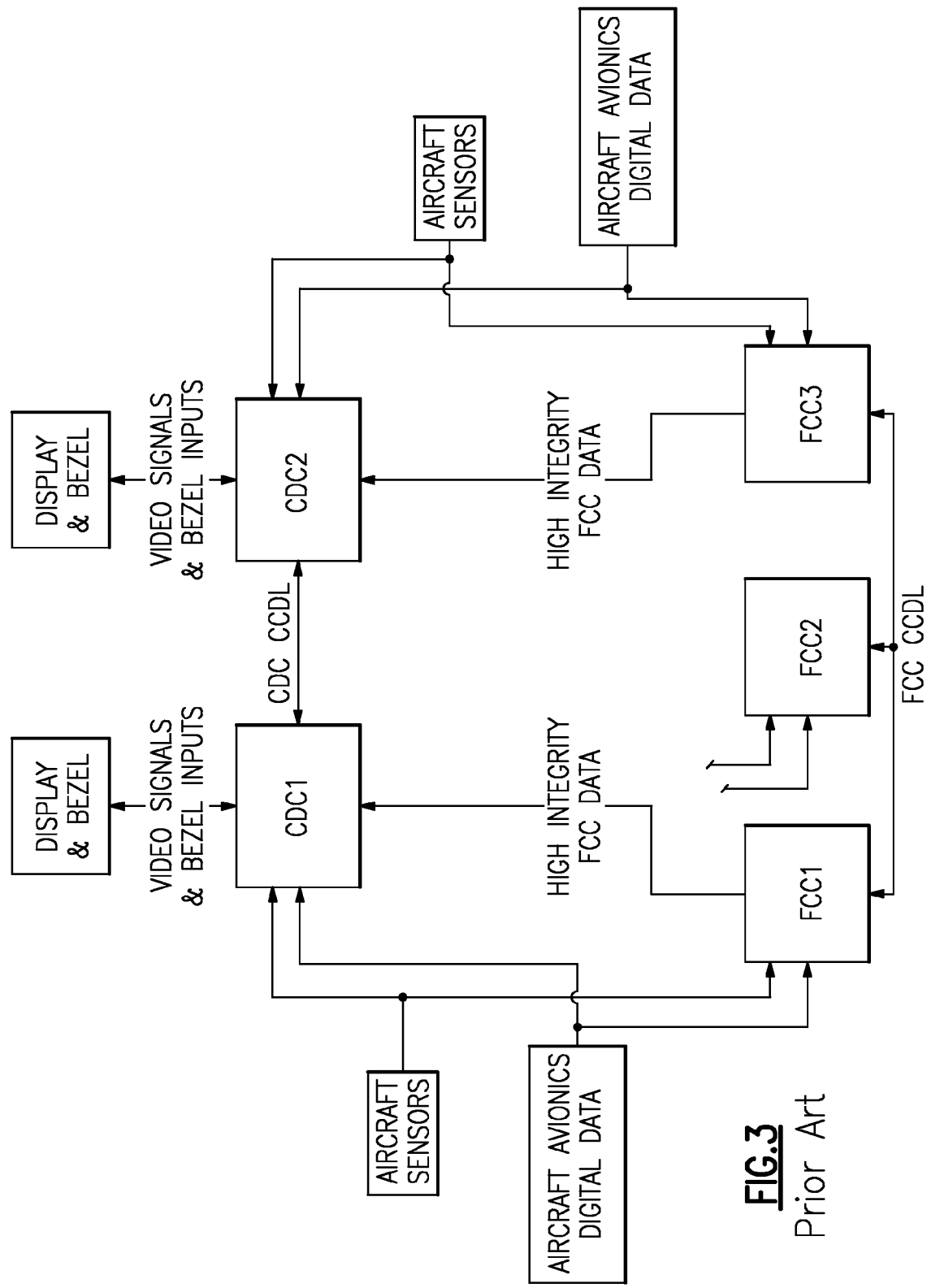
FIG. 3 is a PRIOR ART schematic of a Human Machine Interface.

The Human Machine Interface 20 in the disclosed non-limiting embodiment may utilize higher throughput computers as well as the ability to run multiple applications in a partitioned software environment within the FCCs 26. Additionally, the movement toward high speed network backbones of digital avionics facilitates combined software functionality. Another benefit of the disclosed Human Machine Interface 20 is that weight is saved by the reduction of wiring and component reductions which also simplifies maintenance and logistics. For example, the same CCDL that allows creation of high integrity flight control data also facilitates creation of high integrity display data. As can be seen in FIGS. 1 and 3, not only does the Human Machine Interface 20 eliminate the CDCs of FIG. 3 but also eliminates wiring between CDCs and sensors, avionics, FCCs, as well as other CDCs.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A Human Machine Interface comprising:
   a cockpit display system includes at least one of a Multi Function Display (MFD) and a Primary Flight Display (PFD); and
   a flight control system configured to communicate display data directly to said cockpit display system, said flight control system includes a multiple of flight control computers (FCCs) interconnected by a Cross Channel Data Link (CCDL) and at least one of said multiple of flight control computers (FCCs) include a video interface to generate said display data, wherein said video interface is a separate processing card, said flight control system is separate from said cockpit display system and is configured to control avionics, wherein said flight control system includes a triple modular redundant flight control computer (FCC) architecture in which each of said is identical in hardware and software and interconnected by said Cross Channel Data Link (CCDL).

2. The Human Machine Interface as recited in claim 1, wherein said video interface is a software partition on a processor of at least one of said multiple of flight control computers (FCCs).

3. The Human Machine Interface as recited in claim 1, wherein said flight control system is operable to communicate display data directly to said cockpit display system without cockpit display computers.

4. The Human Machine Interface as recited in claim 3, wherein, said FCCs are configured to communicate with sensor systems and cockpit controls.

5. A method of presenting display data on a cockpit display system comprising:
   communicating display data from a flight control system directly to a cockpit display system, wherein said flight control system includes multiple flight control computers (FCCs) and said cockpit display system includes at least one of a Multi Function Display (MFD) and a Primary Flight Display (PFD), wherein said flight control system is separate from said cockpit display system and is configured to control avionics; and
   determining output control values by a majority vote of multiple redundant flight control computers.

6. The method as recited in claim 5, wherein communicating display data includes communicating primary flight display symbology and communicating multi function display symbology.

7. The method as recited in claim 5, wherein communicating display data includes communicating multi function display symbology.

8. The method as recited in claim 5, further comprising communicating bezel input data and communicating outputs to a flight control actuation system.

9. The method as recited in claim 5, further comprising communicating outputs to a flight control actuation system.

10. The method as recited in claim 5, including calculating flight control laws and outputting control values to produce changes in hydraulic, electrical, or mechanical flight control actuation systems.

\* \* \* \* \*